United States Patent
Bobst

(10) Patent No.: US 6,935,636 B2
(45) Date of Patent: Aug. 30, 2005

(54) ARRANGEMENT FOR THE DETACHABLE MOUNTING OF A ROTATABLE TOOL ON A DRIVE SHAFT

(75) Inventor: Max Bobst, Solothurn (CH)

(73) Assignee: WASAG- Tool AG, Oberentfelden (CH)

( * ) Notice: Subject to any disclaimer, the term of this patent is extended or adjusted under 35 U.S.C. 154(b) by 277 days.

(21) Appl. No.: 10/299,782

(22) Filed: Nov. 20, 2002

(65) Prior Publication Data

US 2003/0141674 A1 Jul. 31, 2003

(30) Foreign Application Priority Data

Jan. 29, 2002 (CH) .................................... 2002 0145/02

(51) Int. Cl.$^7$ .............................................. B23B 31/11
(52) U.S. Cl. .............................. 279/8; 279/93; 279/99; 279/143; 403/282; 403/350
(58) Field of Search .............................. 279/7, 8, 93, 99, 279/143, 144, 145; 408/222; 403/280, 282, 350–352; 411/301, 417, 418, 554

(56) References Cited

U.S. PATENT DOCUMENTS

| | | | | |
|---|---|---|---|---|
| 2,549,967 A | * | 4/1951 | Gustavsson | 279/103 |
| 3,053,118 A | * | 9/1962 | Aime | 76/108.1 |
| 3,545,777 A | * | 12/1970 | Friedheim | 279/99 |
| 3,842,877 A | * | 10/1974 | Andrews | 411/277 |
| 4,834,596 A | * | 5/1989 | Hollifield et al. | 409/232 |
| 5,048,375 A | * | 9/1991 | Kobayashi | 76/108.6 |
| 5,074,025 A | * | 12/1991 | Willard, III | 29/505 |
| 5,292,082 A | | 3/1994 | Genevray | |
| 5,494,382 A | * | 2/1996 | Kloppers | 408/226 |

FOREIGN PATENT DOCUMENTS

| | | |
|---|---|---|
| EP | 0517341 | 12/1992 |
| EP | 0857799 | 8/1998 |
| EP | 1016742 A1 | 7/2000 |
| EP | 1016742 B1 | 3/2002 |
| FR | 2482892 | 11/1981 |

OTHER PUBLICATIONS

Copy of the claims in the English Language of EP 1 016 742 B1.

* cited by examiner

Primary Examiner—Daniel W. Howell
Assistant Examiner—Luke Parsons
(74) Attorney, Agent, or Firm—Greenblum & Bernstein, P.L.C.

(57) ABSTRACT

Rotatable tool coupled to support body, and drive shaft detachably mounted to rotatable tool, such that rotatable tool is drivable in a working direction, in which support body includes an inlet opening defined by at least three eccentric segments and drive shaft includes an immersion area structured and arranged for insertion into the central inlet opening. Immersion area includes at least three longitudinal ribs arranged to project radially outwardly and symmetrically distributed on a circumference of the immersion area, and longitudinal ribs include thread-cutting segments. After inserting immersion area into cylindrical inlet, longitudinal ribs are rotated relative to the support body, whereby thread-cutting segments at least partially cut threads into the at least three eccentric segments to couple drive shaft to support body. The instant abstract is neither intended to define the invention disclosed in this specification nor intended to limit the scope of the invention in any way.

9 Claims, 2 Drawing Sheets

ARRANGEMENT FOR THE DETACHABLE MOUNTING OF A ROTATABLE TOOL ON A DRIVE SHAFT

CROSS-REFERENCE TO RELATED APPLICATIONS

The present application claims priority under 35 U.S.C. §119 of Swiss Patent Application No. 2002 0145/02, filed on Jan. 29, 2002, the disclosure of which is expressly incorporated by reference herein in its entirety.

BACKGROUND OF THE INVENTION

1. Field of the Invention

The present invention relates to an arrangement for the detachable mounting of a rotatable tool on a drive shaft, whereby the tool is attached to a support body detachably mounted on a drive shaft.

2. Discussion of Background Information

From European Patent Application No. EP-A1-1016742, an arrangement is known for attaching a tool, e.g., a cylindrical brush, to a drive shaft. The bristles of the cylindrical brush are attached to the surface of a cylindrical support body, and the support body is fixed on the drive shaft under spring pressure between two annular stop faces connected to the drive shaft in a rotationally locked manner. The stop faces engage the two opposite front surfaces of the cylindrical support body. Replacing the brush entails the dismantling and reassembly of the stop faces and is associated with considerable expense. This arrangement is not suitable for use in fully automatic processing plants, because the fully automatic replacement of the worn brushes would be complicated. Moreover, this arrangement is composed of a relatively large number of individual parts, which leads to economic disadvantages.

Moreover, expandable mandrels for attaching a support body to a drive shaft are generally known. These mandrels have economic disadvantages and cause great expense in fully automatic processing plants.

SUMMARY OF THE INVENTION

The present invention is directed to an arrangement for the detachable mounting of a rotatable tool on a drive shaft of the type mentioned at the outset. In this way, a simple mounting of the support body of the tool on the drive shaft is possible and is suitable for use in fully automatic processing plants and is economically advantageous.

The support body, according to the invention, is made of a relatively soft material and features a central, essentially cylindrical inlet opening with at least three eccentric segments projecting radially inwardly and symmetrically distributed on the circumference. The radii of these segments steadily decreases in the rotational direction of the support body from the largest cylindrical diameter of the inlet opening to an end of the segment. On an immersion area provided for insertion into the central inlet opening of the support body, the drive shaft, which is made of a relatively harder material, features at least three longitudinal ribs projecting radially outwardly and symmetrically distributed on the circumference, such that the longitudinal ribs are provided with thread-cutting segments on their cylindrical surfaces in order to partially cut threads in the eccentric segments of the support body during the mounting of the locked support body on the drive shaft executing a rotating movement. In this manner, an axially and rotationally locked connection between the support body and the drive shaft is achieved. Because the relatively soft support body features in its central inlet opening three radially projecting segments with radii decreasing in the rotational direction of the support body, it is possible with a locked or at least braked support body to cut threads in it with the cylindrical thread-cutting segments of the drive shaft. Thus, the connection between the support body and the drive shaft in the rotational direction and in the axial direction is produced. This connection can be disconnected in a fully automatic processing plant by locking the support body and reversing the rotational direction of the drive shaft. The connection of a new replacement tool to a new support body is made by thread cutting with the aid of the drive shaft in the locked or braked new support body of the replacement tool in one operation.

The edges of the thread-cutting segments at the front in the rotational direction of the drive shaft, which are intended for thread cutting in the eccentric segments located in the central inlet opening, are advantageously embodied in a sharp-edged manner. In order to facilitate thread cutting in the support body, the edges of the thread-cutting segments at the front in the rotational direction of the drive shaft are embodied in a sharp-edged manner.

The edges of the thread-cutting segments facing away from the rotational direction of the drive shaft can be rounded off to facilitate the release of the drive shaft from the central inlet opening of the support body by reversing the rotational direction of the drive shaft in the central inlet opening. In order to facilitate the disconnection of the connection between the drive shaft and the locked support body by reversing the rotational direction of the drive shaft, the edges of the thread-cutting segments facing away from the rotational direction of the drive shift are rounded off.

The thread of the thread-cutting segments is advantageously an acute triangular thread. In order to reduce the resistance during thread cutting in the support body of the tool, the thread-cutting segments formed on the drive shaft are embodied in the shape of an acute triangular thread.

The present invention is directed to an apparatus that includes a rotatable tool coupled to a support body that is composed of first material and a drive shaft, composed of a second material that is harder than the first material, detachably mounted to the rotatable tool, such that the rotatable tool is drivable in a working direction. The support body includes a cylindrical inlet opening defined by at least three eccentric segments arranged to project radially inwardly and symmetrically distributed on a circumference of the cylindrical inlet, in which radii of each of the at least three eccentric segments decrease in the working direction from a largest cylindrical diameter of the inlet opening to an end of the eccentric segment. The drive shaft includes an immersion area structured and arranged for insertion into the central inlet opening, and includes at least three longitudinal ribs arranged to project radially outwardly and symmetrically distributed on a circumference of the immersion area. The longitudinal ribs includes thread-cutting segments. After inserting the immersion area into the cylindrical inlet, the longitudinal ribs are rotated relative to the support body, such that the thread-cutting segments at least partially cut threads into the at least three eccentric segments to couple the drive shaft to the support body.

According to a feature of the invention, the drive shaft is axially and rotationally locked in connection with the support body.

In accordance with another feature of the present invention, leading edges of the thread-cutting segments, relative to the working direction, are sharpened for thread cutting in the eccentric segments.

Further, trailing edges of the thread-cutting segments, relative to the working direction, are rounded to facilitate a release of the drive shaft from the central inlet by rotating in a counter-working direction.

According to still another feature of the present invention, the thread-cutting segments can include acute triangular threads.

In accordance with the invention, the first material is one of plastic or aluminum and the second material is steel.

In accordance with yet another feature of the invention, the immersion area can include a triangular region in which each angle is formed by the longitudinal ribs.

The present invention is directed to an apparatus that includes a rotatable tool coupled to a support body, and a drive shaft detachably mounted to the rotatable tool, such that the rotatable tool is drivable in a working direction, in which the support body includes an inlet opening defined by at least three eccentric segments and the drive shaft includes an immersion area structured and arranged for insertion into the central inlet opening. The immersion area includes at least three longitudinal ribs arranged to project radially outwardly and symmetrically distributed on a circumference of the immersion area, and the longitudinal ribs include thread-cutting segments. After inserting the immersion area into the cylindrical inlet, the longitudinal ribs are rotated relative to the support body, whereby the thread-cutting segments at least partially cut threads into the at least three eccentric segments to couple the drive shaft to the support body.

The present invention is directed to a process for attaching a rotatable tool to a drive shaft, in which the rotatable tool is coupled to a support body that includes a cylindrical inlet opening defined by at least three eccentric segments arranged to project radially inwardly and symmetrically distributed on a circumference of the cylindrical inlet, where radii of each of the at least three eccentric segments decrease in the working direction from a largest cylindrical diameter of the inlet opening to an end of the eccentric segment, and the drive shaft includes an immersion area structured and arranged for insertion into the central inlet opening, the immersion area having at least three longitudinal ribs, each including thread-cutting segments, arranged to project radially outwardly and symmetrically distributed on a circumference of the immersion area. The process includes inserting the immersion area into the cylindrical inlet, and rotating the longitudinal ribs relative to the support body, thereby at least partially cutting threads into the at least three eccentric segments to couple the drive shaft to the support body.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
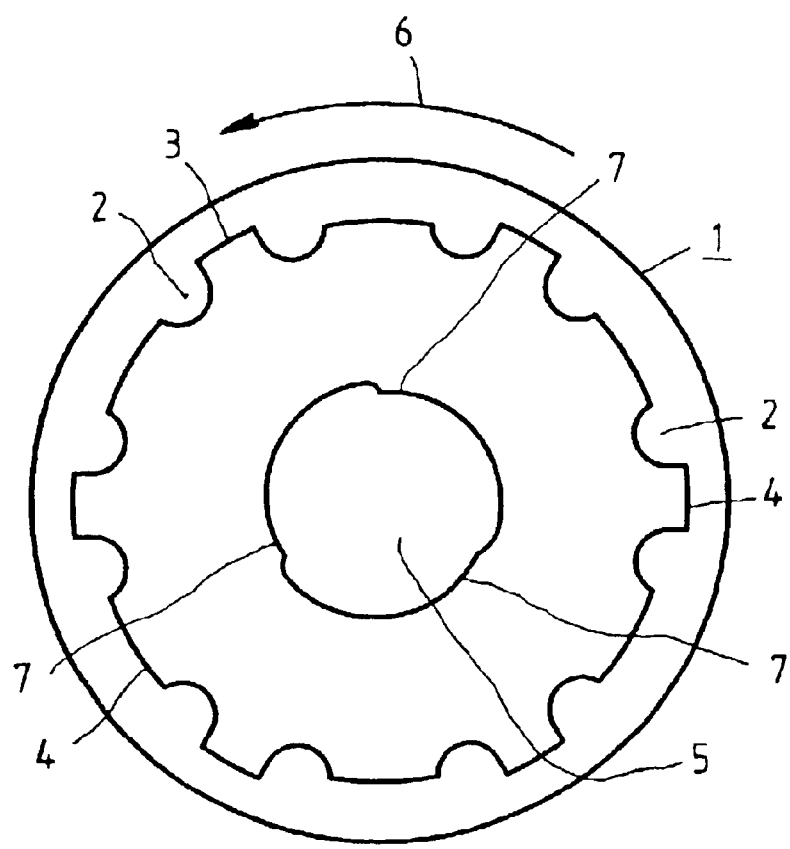
FIG. 1 illustrates a front view of a support body without tool.
Figure 2:
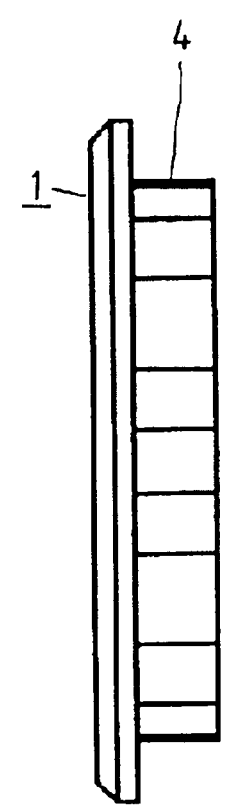
FIG. 2 illustrates a side view of the support body depicted in FIG. 1.

FIG. 1 shows a front view of a support body 1. Support body 1 is provided to hold a rotatable tool (not shown). The tool can be, e.g., a round brush that can be used in a fully automatic processing plant. FIG. 2 shows a side view of support body 1, in which a cylindrical mounting surface 4 for the tool (not shown) is provided with indentations 2 and with ribs 3.

Support body 1 is made of a relatively soft material, e.g., plastic or aluminum, and an essentially cylindrical inlet opening 5 is located in the middle of support body 1. A rotational direction of support body 1, which can be equipped with a tool, is indicated by arrow 6 pointing in the counterclockwise direction. Three eccentric segments 7 are symmetrically distributed and arranged to form a circumference of inlet opening 5. The radii of segments 7 steadily decrease in the rotational direction 6 of support body 1 from a largest cylindrical diameter of inlet opening 5 up to an end of eccentric segment 7. At the end of eccentric segment 7, the radius of inlet opening 5 suddenly increases to a value of the largest cylindrical diameter of inlet opening 5. The production of support body 1 of a relatively soft material, i.e., of plastic or soft metal, such as aluminum, is possible at a reasonable cost. Mounting a rotatable tool on support body 1 is part of the basic knowledge of one skilled in the art.

Figure 3:
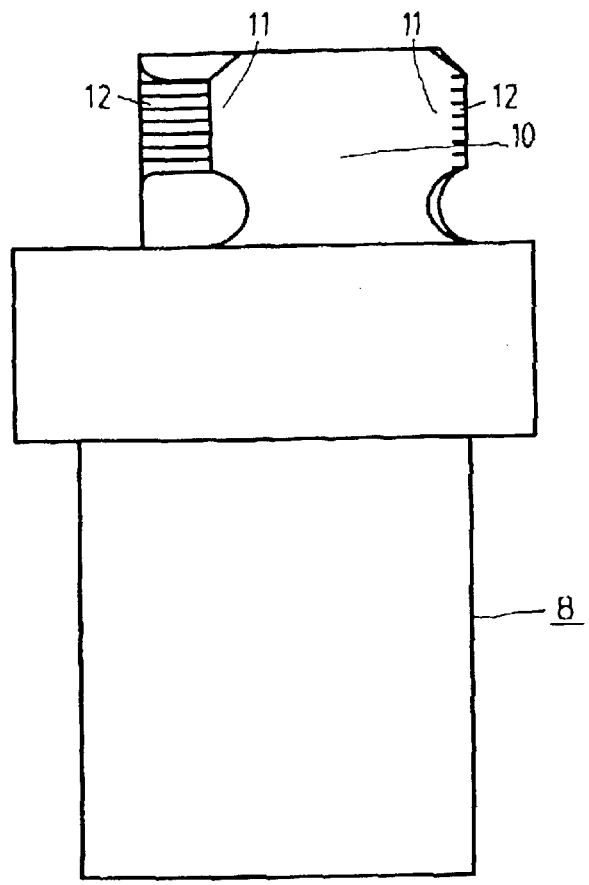
FIG. 3 illustrates a side view of a drive shaft.
Figure 5:
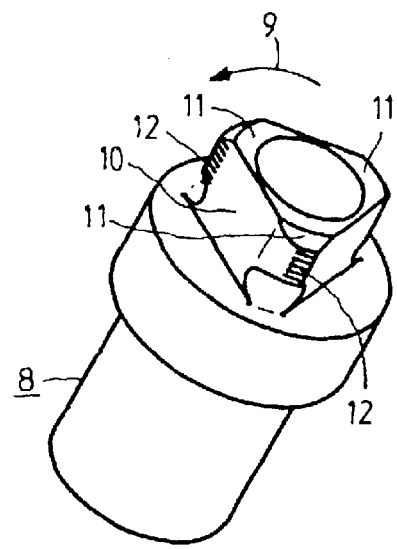
FIG. 5 illustrates a perspective view of the drive shaft depicted in FIG. 3.
Figure 4:
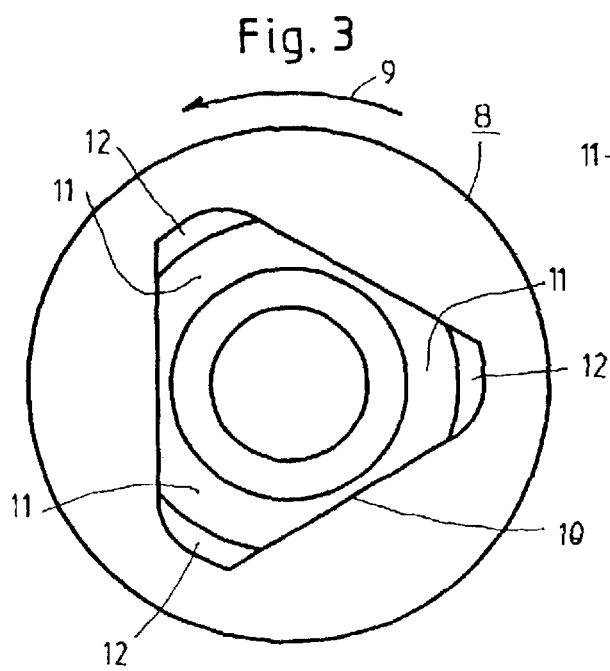
FIG. 4 illustrates a plan view of the drive shaft depicted in FIG. 3.

FIGS. 3 and 4 show a side view and a plan view of a drive shaft 8, respectively, and FIG. 5 shows a perspective view of drive shaft 8. A lower part of drive shaft 8 in FIG. 3 is fixed in a generally known drive arrangement (not shown) and thereby operationally driven counterclockwise (as shown by arrow 9 in FIG. 4).

Drive shaft 8 is made of a relatively hard material, i.e., as a general rule, steel.

Figure 6:
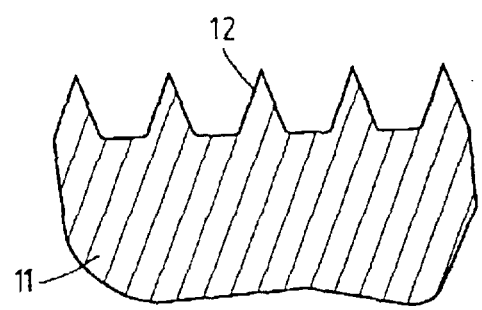
FIG. 6 illustrates a cross section of a portion of the thread profile of the thread-cutting segments on the drive shaft.

A front immersion area 10 of drive shaft 8, which is provided for insertion into central inlet opening 5 of support body 1, features an outer radius corresponding to the largest diameter of cylindrical inlet opening 5. Three radially projecting longitudinal ribs 11, symmetrically distributed over the circumference are formed on immersion area 10. The cylindrical surfaces of longitudinal ribs 11 are provided with thread-cutting segments 12. FIG. 6 shows a cross section of a portion of thread-cutting segments 12. As shown in the Figures, it is discernible that the thread of thread-cutting segments 12 is an acute triangular thread, which can have an advantageous effect on the thread cutting.

In order to attach support body 1 to drive shaft 8, support body 1 is locked or at least braked. Immersion area 10 of drive shaft 8 is inserted into central inlet opening 5 of support body 1, such that the largest cylindrical diameter of inlet opening 5 of support body 1 are arranged to accept the three longitudinal ribs 11 of drive shaft 8. As soon as immersion area 10 of drive shaft 8 is inserted into inlet opening 5 of support body 1, drive shaft 8 is rotatably driven in direction 9 (see FIG. 4) relative to locked or at least braked support body 1. As a result of this rotational movement, thread-cutting segments 12 cut into eccentric segments 7 with decreasing radii, since these segments project into inlet opening 5. If the rotational movement of drive shaft 8 is continued, thread cutting occurs in the relatively soft eccentric segments 7 in support body 1. The rotation of drive shaft 8, and, therefore, the thread cutting is stopped before thread-cutting segments 12 reach the end of eccentric segments 7, and support body 1 is then released. In this manner, the tool attached to support body 1, which is no longer braked or locked, is released for use in a processing plant. As further thread cutting would require a torque in excess of the torque requirement of processing, support body 1 remains firmly attached to drive shaft 8 during processing in the rotational direction.

Detachment of support body 1 from drive shaft 8 is performed by simply reversing the rotational direction of drive shaft 8 while support body 1 is again locked or braked. In order to support this movement, the edges of thread-cutting segment 12, which are arranged to face away from the rotational direction for thread cutting indicated by arrow 9, are rounded off. After thread-cutting segments 12 leave the thread cut in support body 1, drive shaft 8 can be withdrawn from inlet opening 5 of support body 1. Subsequently, the released immersion area 10 of drive shaft 8 can be inserted into inlet opening 5 of a new (another) support body 1 that supports a new tool, so that the processing operation can continue. In the manner discussed above, the insertion of immersion area 10 into inlet opening 5 of the new support body 1 includes the cutting of threads into the eccentric segments 7.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. An apparatus comprising:
   a rotatable tool coupled to a support body, said support body being composed of first material;
   a drive shaft, composed of a second material that is harder than said first material, detachably mounted to said rotatable tool, such that the rotatable tool is drivable in a working direction;
   said support body comprising a cylindrical inlet opening defined by at least three eccentric segments arranged to project radially inwardly and symmetrically distributed on a circumference of said cylindrical inlet, wherein radii of each of said at least three eccentric segments decrease in the working direction from a largest cylindrical diameter of said inlet opening to an end of said eccentric segment;
   said drive shaft comprising an immersion area structured and arranged for insertion into said central inlet opening, said immersion area comprising at least three longitudinal ribs arranged to project radially outwardly and symmetrically distributed on a circumference of said immersion area;
   said longitudinal ribs comprising thread-cutting segments,
   wherein, after inserting said immersion area into said cylindrical inlet, said longitudinal ribs are rotated relative to said support body, whereby said thread-cutting segments at least partially cut threads into said at least three eccentric segments to couple said drive shaft to said support body.

2. The apparatus in accordance with claim 1, wherein said drive shaft is axially and rotationally locked in connection with said support body.

3. The apparatus in accordance with claim 1, wherein leading edges of said thread-cutting segments, relative to the working direction, are sharpened for thread cutting in the eccentric segments.

4. The apparatus in accordance with claim 1, wherein trailing edges of said thread-cutting segments, relative to the working direction, are rounded to facilitate a release of said drive shaft from said central inlet by rotating in a counter-working direction.

5. The apparatus in accordance with claim 1, wherein said thread-cutting segments comprise acute triangular threads.

6. The apparatus in accordance with claim 1, wherein said first material is one of plastic or aluminum and said second material is steel.

7. The apparatus in accordance with claim 1, wherein said immersion area comprises a triangular region in which each angle is formed by said longitudinal ribs.

8. An apparatus comprising:
   a rotatable tool coupled to a support body;
   a drive shaft detachably mounted to said rotatable tool, such that the rotatable tool is drivable in a working direction;
   said support body comprising a inlet opening defined by at least three eccentric segments;
   said drive shaft comprising an immersion area structured and arranged for insertion into said central inlet opening, said immersion area comprising at least three longitudinal ribs arranged to project radially outwardly and symmetrically distributed on a circumference of said immersion area;
   said longitudinal ribs comprising thread-cutting segments,
   wherein, after inserting said immersion area into said cylindrical inlet, said longitudinal ribs are rotated relative to said support body, whereby said thread-cutting segments at least partially cut threads into said at least three eccentric segments to couple said drive shaft to said support body.

9. A process for attaching a rotatable tool to a drive shaft, in which the rotatable tool is coupled to a support body that includes a cylindrical inlet opening defined by at least three eccentric segments arranged to project radially inwardly and symmetrically distributed on a circumference of the cylindrical inlet, where radii of each of the at least three eccentric segments decrease in the working direction from a largest cylindrical diameter of the inlet opening to an end of the eccentric segment, and the drive shaft includes an immersion area structured and arranged for insertion into the central inlet opening, the immersion area having at least three longitudinal ribs, each including thread-cutting segments, arranged to project radially outwardly and symmetrically distributed on a circumference of the immersion area, said process comprising:
   inserting the immersion area into the cylindrical inlet;
   rotating the longitudinal ribs relative to the support body, thereby at least partially cutting threads into the at least three eccentric segments to couple the drive shaft to the support body.

* * * * *